(12) United States Patent
Harada et al.

(10) Patent No.: US 7,443,470 B2
(45) Date of Patent: Oct. 28, 2008

(54) LIQUID CRYSTAL DEVICE AND ELECTRONIC APPARATUS

(75) Inventors: Norihito Harada, Azuhino (JP);
Kimitaka Kamijo, Shiajiri (JP);
Katsuhiro Imai, Nagano-ken (JP);
Toshihiro Otake, Okaya (JP)

(73) Assignee: Epson Imaging Devices Corporation, Nagano (JP)

( * ) Notice: Subject to any disclaimer, the term of this patent is extended or adjusted under 35 U.S.C. 154(b) by 261 days.

(21) Appl. No.: 11/524,255

(22) Filed: Sep. 21, 2006

(65) Prior Publication Data

US 2007/0076146 A1    Apr. 5, 2007

(30) Foreign Application Priority Data

Sep. 30, 2005    (JP) .............................. 2005-286275

(51) Int. Cl.
*G02F 1/1335* (2006.01)
(52) U.S. Cl. ....................................... 349/114; 349/113
(58) Field of Classification Search ................... 349/44, 349/106, 110, 113, 114, 117, 141, 155
See application file for complete search history.

(56) References Cited

U.S. PATENT DOCUMENTS

| | | | | |
|---|---|---|---|---|
| 6,476,889 B2* | 11/2002 | Urabe et al. | ................. | 349/113 |
| 6,919,944 B2* | 7/2005 | Maeda | ........................ | 349/113 |
| 7,088,409 B2* | 8/2006 | Itou et al. | .................... | 349/114 |
| 2002/0054269 A1* | 5/2002 | Maeda et al. | ................ | 349/113 |
| 2003/0117551 A1* | 6/2003 | Fujimori et al. | ............. | 349/113 |
| 2003/0133062 A1* | 7/2003 | Maeda | ........................ | 349/113 |
| 2006/0038937 A1* | 2/2006 | Kaneko et al. | ............... | 349/110 |
| 2007/0258027 A1* | 11/2007 | Maeda et al. | ................ | 349/113 |

FOREIGN PATENT DOCUMENTS

| JP | A 2003-248222 | 9/2003 |
|---|---|---|
| JP | A 2004-325822 | 11/2004 |
| JP | A 2004-354507 | 12/2004 |
| JP | A 2006-72190 | 3/2006 |

\* cited by examiner

*Primary Examiner*—Quyen P Leung
(74) *Attorney, Agent, or Firm*—Oliff & Berridge, PLC

(57) ABSTRACT

A liquid crystal device includes a pair of substrates, a liquid crystal layer provided between the substrates, and a plurality of sub-pixels each having a transmissive display region and a reflective display region. One of the substrates includes switching elements corresponding to the sub-pixels, lines connected to the switching elements, and an insulating film provided on the switching elements and the lines. The insulating film includes first recesses provided in the transmissive display regions, and second recesses provided along boundaries between the adjoining sub-pixels. At least a part of the insulating film other than the first and second recesses planarly overlaps with the reflective display regions. The thickness of the liquid crystal layer is smaller in the reflective display regions than in the transmissive display regions having the first recesses. The depth of the second recesses is smaller than the depth of the first recesses.

12 Claims, 6 Drawing Sheets

LIQUID CRYSTAL DEVICE AND ELECTRONIC APPARATUS

BACKGROUND

1. Technical Field

The present invention relates to a liquid crystal device and an electronic apparatus, and more particularly, to an electrooptical device including a transmissive display region and a reflective display region in each sub-pixel.

2. Related Art

In general, liquid crystal devices have a cell structure in which liquid crystal is sealed between a pair of substrates, and an alignment film is provided on each of the substrates to regulate the initial alignment state of the liquid crystal. The alignment film is formed, for example, by applying unset resin, such as polyimide, onto the inner surface of each of the substrates by spin coating or printing, and drying or baking the resin.

Liquid crystal devices usually adopt a transmissive display method using transmitted light from a backlight, and a reflective display method using reflected external light. In particular, most mobile electronic apparatuses include a transflective liquid crystal device capable of transmissive display and reflective display. In a transflective liquid crystal device, sub-pixels are arranged in an effective driving region. Each of the sub-pixels includes a transmissive display region capable of transmissive display with a backlight, and a reflective display region capable of reflective display with external light.

In the transflective liquid crystal device, transmitted light for transmissive display passes through a liquid crystal layer only once, whereas reflected light for reflective display passes through the liquid crystal layer twice. Therefore, the degree of retardation of display light caused by the liquid crystal layer substantially differs between transmissive display and reflective display. In order to reduce the difference in retardation between the transmissive display and the reflective display, the thickness of the liquid crystal layer in the reflective display region is usually set to be smaller than the thickness in the transmissive display region.

More specifically, the thickness of the liquid crystal layer is controlled by forming an insulating film on only a part of the inner surface of the substrate. That is, as disclosed in JP-A-2003-248222, a thick insulating film is provided in the reflective display region of the sub-pixel, and an insulating film is not provided or a thin insulating film is provided in the transmissive display region, so that the thickness of the liquid crystal layer sandwiched between the substrates is made different between the reflective display region and the transmissive display region.

However, in the above-described transflective liquid crystal device, the insulating film is locally provided on the substrate, when an unset resin is applied on the substrate, it collects on regions where the insulating film is not provided (transmissive display regions). Consequently, the thickness of the alignment film becomes nonuniform, and display quality is lowered. Accordingly, JP-A-2004-325822 discloses that each recessed transmissive display region continuously extends through the adjoining pixels in order to enhance the fluidity of the alignment resin and to reduce nonuniformity of the thickness of the alignment film (particularly in FIGS. 3 and 13 to 17).

In the above-described improved liquid crystal device, fluidity of the alignment resin is enhanced because the recessed transmissive display region continuously extends through the pixels, whereas the problem of the nonuniform thickness of the alignment film is sometimes not solved satisfactorily. For example, when an insulating film is patterned such that a reflective display region is also formed such as to continuously extend through pixels, the reflective display region is interposed between continuous transmissive display regions. Therefore, the alignment resin entering from the reflective display region scatters in the extending direction of the transmissive display regions. Particularly at a peripheral edge of the transmissive display region close to the reflective display region, the thickness of the alignment film becomes nonuniform, and display quality is lowered. Further, when the alignment resin is applied by printing, degradation of display quality is sometimes inevitable, depending on the relationship between the printing direction and the extending direction of the transmissive display region.

A technique of forming an island-shaped reflective display region in each pixel is also adopted in the above-described liquid crystal device. In this case, a groove is provided between reflective display regions. Since the alignment resin can flow laterally and longitudinally (horizontally and vertically), it can be thought that nonuniformity of the thickness of the alignment film can be reduced. However, since the peripheral edge of the reflective display region is long compared with the area of the reflective display region, alignment defects of liquid crystal are easily caused by a height difference formed at the peripheral edge of the reflective display region, and display quality is lowered.

SUMMARY

An advantage of some aspects of the invention is that it provides a liquid crystal device that is highly resistant to degradation of display quality due to a nonuniform thickness of an alignment film thereof by preventing the flow of the alignment material constituting the alignment film from being hindered by an insulating film, and due to alignment defects of liquid crystal at a peripheral edge of the insulating film.

A liquid crystal device according to an aspect of the invention includes a pair of substrates, a liquid crystal layer provided between the substrates, and a plurality of sub-pixels each having a transmissive display region and a reflective display region. One of the substrates includes switching elements corresponding to the sub-pixels, lines connected to the switching elements, and an insulating film provided on the switching elements and the lines. The insulating film has first recesses provided in the transmissive display regions and second recesses provided along boundaries between the adjoining sub-pixels. At least a part of the insulating film other than the first and second recesses planarly overlaps with the reflective display regions. The thickness of the liquid crystal layer is smaller in the reflective display regions than in the transmissive display regions having the first recesses. The depth of the second recesses is smaller than the depth of the first recesses.

In this case, fluidity of an alignment material can be enhanced by the existence of the second recesses. Moreover, since the second recesses are disposed along the boundaries between the sub-pixels that are frequently shielded by any means, the influence on the display can be reduced. Since the depth of the second recesses is smaller than that of the first recesses, surface stepped portions in contact with the liquid crystal layer can be reduced, and the influence on the display can be reduced further. Even when lines are provided along the boundaries, a part of the insulating film remains under bottom portions of the second recesses because the depth of the second recesses is smaller than that of the first recesses. This prevents a short circuit.

Preferably, the sub-pixels are arranged in a horizontal direction and a vertical direction, the first recesses are connected in the horizontal direction, and the second recesses extend along the boundaries between the sub-pixels adjoining in the horizontal direction. In this case, the first recesses are connected in the horizontal direction, and the second recesses having a depth smaller than the depth of the first recesses extend along the boundaries between the sub-pixels adjoining in the horizontal direction. Therefore, the alignment material can easily flow in both the horizontal and vertical directions.

Preferably, the sub-pixels are arranged in a horizontal direction and a vertical direction, the first recesses are connected in the horizontal direction, and the second recesses extend in the vertical direction. In this case, the first recesses are connected in the horizontal direction, and the second recesses having a depth smaller than the depth of the first recesses extend in the vertical direction. Therefore, the alignment material can easily flow in both the horizontal and vertical directions.

Preferably, the sub-pixels are arranged in a horizontal direction and a vertical direction, each of the second recesses includes a portion extending in the horizontal direction and a portion extending in the vertical direction. In this case, the alignment material can easily flow in both the horizontal and vertical directions.

A liquid crystal device according to another aspect of the invention includes a pair of substrates, a liquid crystal layer provided between the substrates, and a plurality of sub-pixels each having a transmissive display region and a reflective display region. One of the substrates includes switching elements corresponding to the sub-pixels, lines connected to the switching elements, and an insulating film provided on the switching elements and the lines. The insulating film has first recesses provided in the transmissive display regions, and second recesses provided above the lines. At least a part of the insulating film other than the first and second recesses planarly overlaps with the reflective display regions. The thickness of the liquid crystal layer is smaller in the reflective display regions than in the transmissive display regions having the first recesses. The depth of the second recesses is smaller than the depth of the first recesses.

In this case, fluidity of the alignment material can be enhanced by existence of the second recesses. Moreover, since the second recesses are disposed in the portions above the lines that are frequently shielded by the lines or any other means, the influence on the display can be reduced. Since the depth of the second recesses is smaller than that of the first recesses, surface stepped portions in contact with the liquid crystal layer can be reduced, and the influence on the display can be reduced further. In addition, since the depth of the second recesses is smaller than that of the first recesses, a part of the insulating film remains under bottom portions of the second recesses. This prevents a short circuit.

Preferably, the second recesses are grooves extending along the lines. In this case, the fluidity of the alignment material can be enhanced further. Moreover, since the second recesses can be disposed along the boundaries between the adjoining sub-pixels, the influence on the display can be reduced.

Preferably, the sub-pixels are arranged in a horizontal direction and a vertical direction, the first recesses are connected in the horizontal direction, and the second recesses extend in the vertical direction. In this case, the first recesses are connected in the horizontal direction, and the second recesses having a depth smaller than the depth of the first recesses extend in the vertical direction. Therefore, the fluidity of the alignment material can be enhanced while reducing the influence on the display.

Preferably, the sub-pixels are arranged in a horizontal direction and a vertical direction, and the lines extend in the vertical direction. The liquid crystal device may further include lower lines extending in the horizontal direction below the lines, and an interlayer insulating layer provided between the lines and the lower lines. Since the interlayer insulating layer is disposed on the lower lines, a short circuit due to the lower lines rarely occurs. However, since the lines are disposed on the interlayer insulating layer, a short circuit due to the lines easily occurs. Therefore, the configuration of this aspect of the invention is particularly effective.

A liquid crystal device according to a further aspect of the invention includes a pair of substrates, a liquid crystal layer provided between the substrates, and a plurality of sub-pixels each having a transmissive display region and a reflective display region. One of the substrates includes switching elements corresponding to the sub-pixels, lines connected to the switching elements, an insulating film provided on the switching elements and the lines, and a reflecting layer provided on the insulating film in the reflective display regions. The lines extend along boundaries between the adjoining sub-pixels. The insulating film includes first recesses provided in the transmissive display regions, and second recesses provided along the lines. At least a part of the insulating film other than the first and second recesses planarly overlaps with the reflective display regions. The thickness of the liquid crystal layer is smaller in the reflective display regions than in the transmissive display regions having the first recesses. A part of the insulating film in a thickness direction is provided between the lines and inner bottom portions of the second recesses.

In this case, since the insulating film has the second recesses outside the transmissive display regions, it is possible to enhance the fluidity of the alignment material while reducing the influence on the display. Moreover, since a part of the insulating film in the thickness direction is interposed between the lines and the second recesses, a short circuit due to the lines and the second recesses can be prevented.

Preferably, the insulating film includes a lower insulating layer provided in the transmissive display regions and the reflective display regions, and an upper insulating layer provided in the reflective display regions. Preferably, the lower insulating layer is interposed between the lines and the inner bottom portions of the second recesses.

A liquid crystal device according to a further aspect of the invention includes a pair of substrates, a liquid crystal layer provided between the substrates, and a plurality of sub-pixels arranged in a horizontal direction and a vertical direction, each of the sub-pixels having a transmissive display region and a reflective display region. One of the substrates includes switching elements corresponding to the sub-pixels, upper lines extending in the vertical direction and lower lines extending in the horizontal direction, the upper and lower lines being connected to the switching elements, an interlayer insulating layer provided between the upper lines and the lower lines, and an insulating film provided on the upper lines. The insulating film includes recesses provided in the transmissive display regions and connected along the sub-pixels adjoining in the vertical direction. A portion of the insulating film other than the recesses covers the upper lines. At least a part of the portion of the insulating film other than the recesses planarly overlaps with the reflective display regions. The thickness of the liquid crystal layer is smaller in the reflective display regions than in the transmissive display regions having the recesses.

In this case, the recesses of the insulating layer provided in the transmissive display regions are connected in the vertical direction such as to cross the lower lines extending in the horizontal direction, and the upper lines extending in the vertical direction are covered with the portion of the insulating film other than the recesses. Consequently, it is possible to prevent a short circuit due to the lines and the recesses while ensuring high fluidity of the alignment material.

Preferably, the liquid crystal device further includes pixel electrodes electrically connected to the switching elements in the respective sub-pixels, and contacts between the switching elements and the pixel electrodes are provided at edges of inner bottom portions of the recesses. In this case, since electrical contacts between the switching elements and the pixel electrodes can be obtained by using the recesses of the insulating film, there is no need to perform a step of forming contact holes.

An electronic apparatus according to a still further aspect of the invention includes any of the liquid crystal devices as a display unit. While the type of the electronic apparatus is not particularly limited, a mobile electronic apparatus, such as a mobile telephone, a mobile computer, or a mobile electronic watch, is particularly effective because transmissive display in the transmissive display region and reflective display in the reflective display region are both possible.

A liquid-crystal-device manufacturing method according to a still further aspect of the invention manufactures a liquid crystal device including a pair of substrates, a liquid crystal layer provided between the substrates, and a plurality of sub-pixels each having a transmissive display region and a reflective display region. The liquid-crystal-device manufacturing method includes forming switching elements corresponding to the sub-pixels and lines connected to the switching elements on one of the substrates; forming an insulating film on the switching elements and the lines, the insulating film including first recesses provided in the transmissive display regions and second recesses provided along boundaries between the adjoining sub-pixels, at least a part of the insulating film other than the first and second recesses planarly overlapping with the reflective display regions, and the second recesses having a depth smaller than a depth of the first recesses; forming an alignment film by applying an alignment material on the substrate such that the alignment material flows in the first and second recesses; and placing the liquid crystal layer, the liquid crystal layer being thinner in the reflective display regions than in the transmissive display regions having the first recesses.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
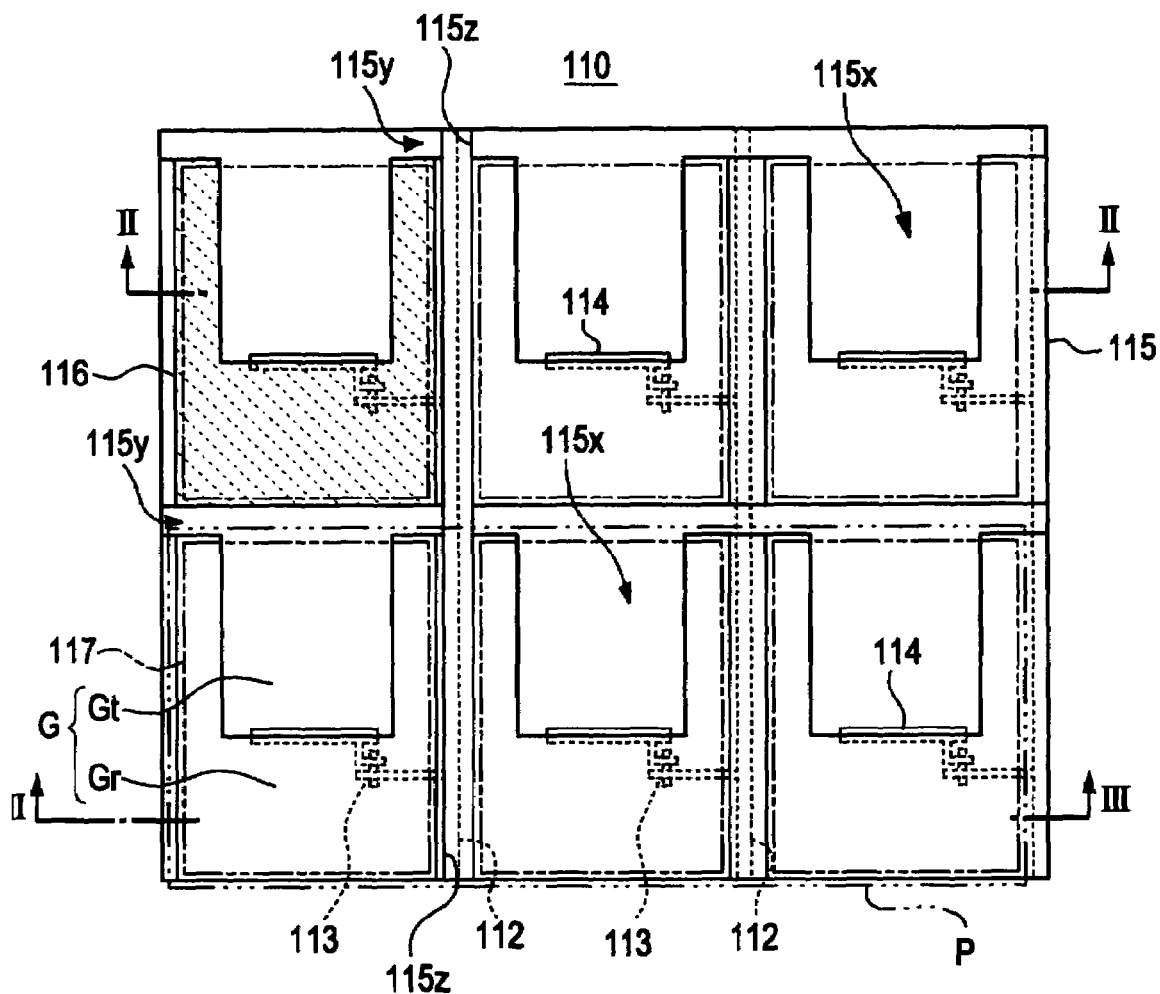
FIG. 1 is a schematic plan view of a first substrate in a liquid crystal device according to a first embodiment of the invention.
Figure 2:
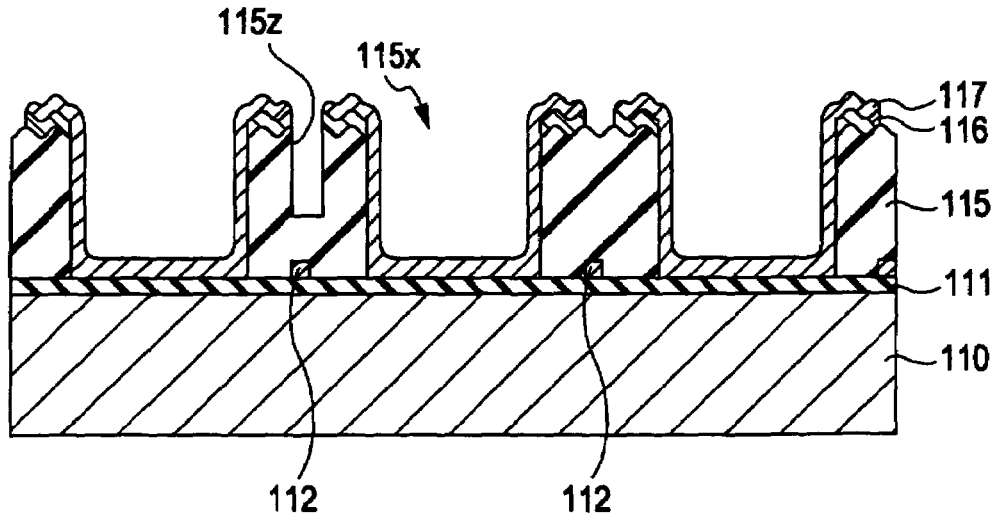
FIG. 2 is a schematic longitudinal sectional view of the first substrate, taken along line II-II in FIG. 1.
Figure 3:
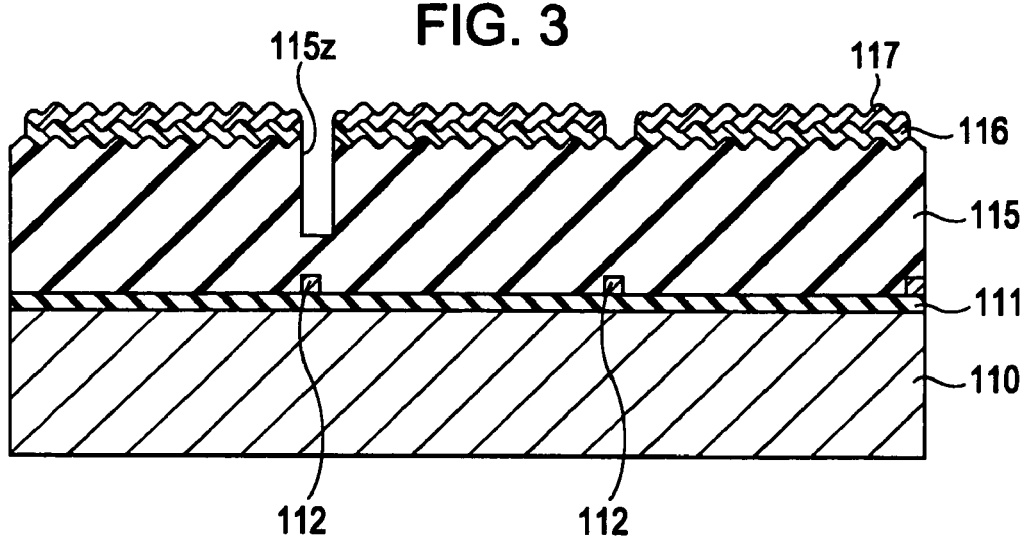
FIG. 3 is a schematic longitudinal sectional view of the first substrate, taken along line III-III in FIG. 1.
Figure 4:
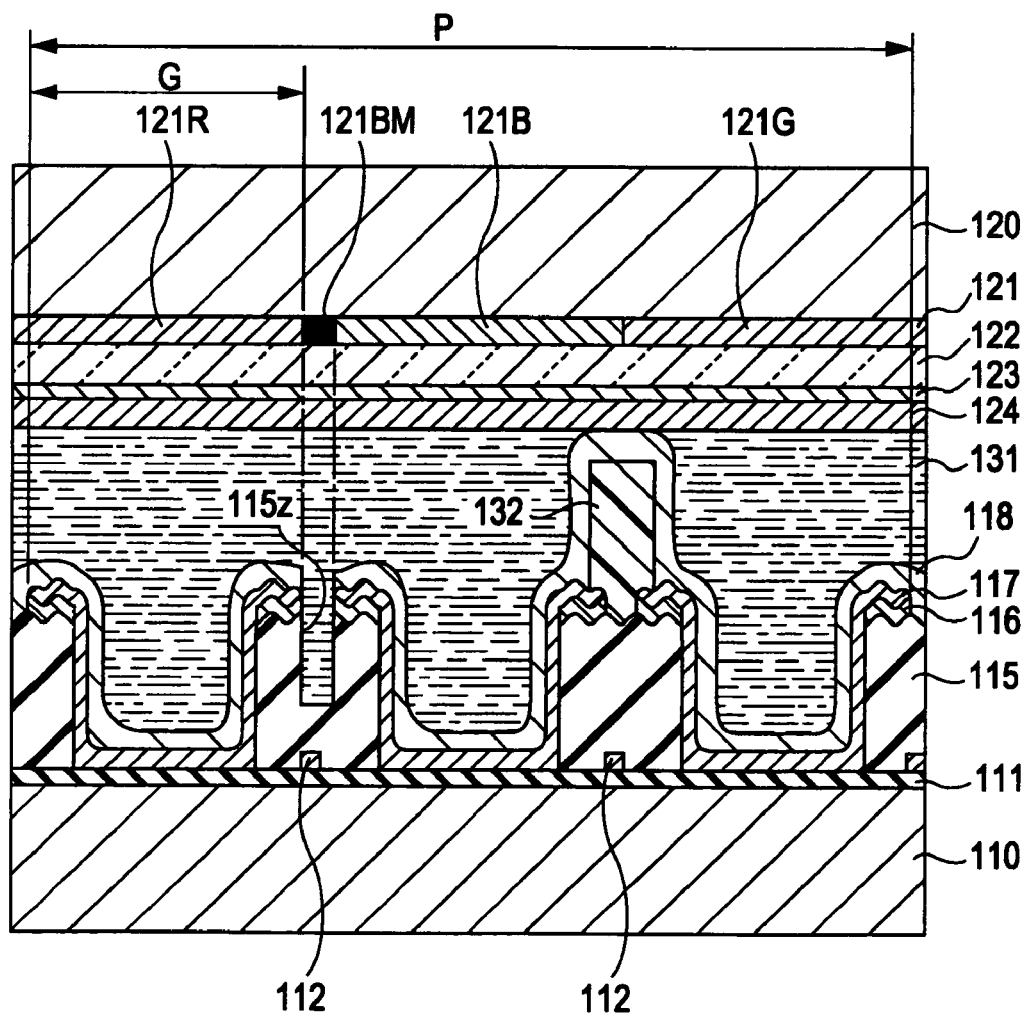
FIG. 4 is a schematic longitudinal sectional view of the liquid crystal device according to the first embodiment.

Embodiments of the invention will now be described in detail with reference to the attached drawings. FIG. 1 is a schematic plan view of a substrate 110 in a liquid crystal device 100 according to a first embodiment, FIG. 2 is a schematic longitudinal sectional view, taken along line II-II in FIG. 1, FIG. 3 is a schematic longitudinal sectional view, taken along line III-III in FIG. 1, and FIG. 4 is an enlarged longitudinal sectional view of the liquid crystal device 100. It should be noted that all the dimensions and dimensional ratios shown in the attached figures are appropriately set for convenience of drawing, and do not represent actual dimensions and dimensional ratios.

The liquid crystal device 100 according to the first embodiment has a panel structure in which a pair of substrates, namely, a first substrate 110 and a second substrate 120 are bonded with a sealing material (not shown), and liquid crystal 131 is sealed therebetween, as shown in FIG. 4. The first substrate 110 is an array substrate (element substrate) including lines and elements, and the second substrate 120 is a color filter substrate (counter substrate) including a color filter.

As shown in FIGS. 1 and 4, sub-pixels G are arranged in a horizontal direction (a right-left direction in FIGS. 1 and 4) and in a vertical direction (an up-down direction in FIG. 1, a direction perpendicular to the plane of FIG. 4). Each of the sub-pixels G includes a reflective display region Gr in which light incident from the second substrate 120 is reflected by a reflecting layer 116 that will be described below, and a transmissive display region Gt in which the reflecting layer 116 is not provided and through which incident light passes.

An insulating layer 111 formed of, for example, $Ta_2O_5$ or $SiO_2$ is provided on the first substrate 110. On the insulating layer 111, a metal line 112 of, for example, Ta, Ta—W, or Al is provided in each sub-pixel column defined by a plurality of sub-pixels G arranged in the vertical direction. The line 112 vertically extends along the boundaries between the sub-pixels G adjoining in the horizontal direction. While the line 112 is provided on the boundaries in the figures, in actuality, it may be shifted from the boundaries in the horizontal direction.

The line 112 is electrically connected to an element 113 provided in each sub-pixel G. The element 113 is electrically connected to a contact electrode 114. In the first embodiment, the element 113 is a TFD (a thin film transistor, a metal-insulator-metal element) serving as a two-terminal nonlinear element, and has a back-to-back structure in which two TFD element structures having opposite polarities are connected in series, as shown in FIG. 1.

The lines 112, the elements 113, and the contact electrodes 114 are formed by known methods using a conductor forming process such as vapor deposition or sputtering, an insulator forming process such as anodic oxidation or CVD, and patterning such as photolithography or etching.

A transparent insulating film 115 formed of acrylic resin or the like is provided on the lines 112 and the elements 113. The insulating film 115 is formed by film deposition such as printing, spin coating, or CVD, and patterning such as photolithography or etching so that a predetermined pattern is provided in each sub-pixel G. The insulating film 115 does not exist in the transmissive display region Gt, but exists in the reflective display region Gr. When the insulating film 115 is formed of a transparent material, a part of the insulating film 115 in the thickness direction may exist in the transmissive display region Gt. That is, in the first embodiment, recesses are provided in the insulating film 115 such that the thickness of the liquid crystal layer 131 is larger in the transmissive display region Gt than in the reflective display region Gr.

The insulating film 115 has the same pattern in each pixel P serving as the minimum display unit defined by a plurality of sub-pixels G. The pixel P is constituted by a plurality of types of sub-pixels G corresponding to a plurality of color layers 121R, 121B, and 121G in a color filter 121 that will be described below. More specifically, one pixel P is constituted by three sub-pixels G adjoining in the horizontal direction.

On the first substrate 110, the insulating film 115 is not provided in the transmissive display regions Gt and in regions along the boundaries between the sub-pixels G adjoining in the vertical direction, and these regions serve as recesses. Recesses 115x provided in the transmissive display regions Gt of the sub-pixels G adjoining in the horizontal direction are connected by recesses 115y provided in the regions along the boundaries between the sub-pixels G adjoining in the vertical direction.

The insulating film 115 also includes grooves 115z provided along the sub-pixels G adjoining in the horizontal direction. The depth of the grooves 115z is smaller than the thickness of the insulating film 115. That is, inner bottom portions of the grooves 115z are disposed higher than a lower surface of the insulating film 115 (a plane on which the insulating film 115 is provided), and portions of the insulating film 115 in the thickness direction remain under the inner bottom portions. Below the grooves 115z, the above-described lines 112 extend parallel to the grooves 115z (that is, in the vertical direction).

In the first embodiment, the groove 115z extends only along the boundary between a red sub-pixel G in which a below-described red color layer is provided (a left sub-pixel in FIGS. 1 and 4) and a blue sub-pixel G in which a blue color layer is provided (a center sub-pixel in FIGS. 1 and 4) in each pixel P. This is because alignment failure is less conspicuous at the boundary between the red and blue sub-pixels than at the boundary between the blue sub-pixel and a green sub-pixel (a right sub-pixel in FIGS. 1 and 4) or than at the boundary between the green and red sub-pixels. However, the groove 15z may be provided at any of these boundaries.

Preferably, the insulating film 115 is formed of a transparent material, and particularly, a resin material. For example, the insulating 115 can be formed of a resin material by photolithography using a half-tone mask. More specifically, the insulating film 115 can be formed by applying a positive photosensitive resin by, for example, printing, exposing the resin with a photomask including transmissive portions corresponding to the recesses 115x and 115y, semitransmissive portions corresponding to the grooves 115z, and shielding portions corresponding to the other portions, and then developing the exposed resin. When a negative photosensitive resin is used, the relationship between the transmissive portions and the shielding portions is inversed.

Preferably, the insulating film 115 has fine surface irregularities. When the insulating film 115 is formed by the above-described lithography, the surface irregularities can be formed with a photomask in which minute transmissive portions are scattered.

1The above-described contact electrode 114 is exposed under a stepped portion provided between the reflective display region Gr and the transmissive display region Gt at an edge of the insulating film 115, that is, at an edge of the inner bottom portion of the recess 115x. The contact electrode 114 is electrically connected to a pixel electrode 117 that will be described below.

A reflecting layer 116 formed of a light reflective material having high reflectance, such as Al or Ag, is provided on the insulating film 115. The reflecting layer 116 is disposed corresponding to the reflective display region Gr of the sub-pixel G, that is, on the insulating film 115 in the sub-pixel G. The reflecting layer 116 has a scattering reflecting surface with fine irregularities corresponding to the fine surface irregularities of the insulating film 115. Since the reflecting layer 116 is formed of a conductive material (metallic material) in the first embodiment, it may be electrically connected to the contact electrode 114.

A pixel electrode 117 formed of a transparent conductor such as ITO (indium tin oxide) is provided in the sub-pixel G. The pixel electrode 117 is electrically connected to the contact electrode 114 directly or via the reflecting layer 116.

On the other hand, color layers 121R, 121B, and 121G are arranged on the second substrate 120 in a predetermined pattern, as shown in FIG. 4. In the color layers 121R, 121B, and 121G, a coloring agent, such as dye or pigment, is dispersed in a transparent resin base material such as acrylic resin. In the first embodiment, color layers of the same color are arranged in the vertical direction, and color layers of different colors are alternately arranged in the horizontal direction, thus constituting a striped color filter 121. The color layers 121R, the color layers 121B, and the color layers 121G constitute a red filter element, a blue filter element, and a green filter element, respectively. A shielding portion can be provided between the color layers of different colors. For example, the shielding portion is formed by overlapping the adjoining different color layers at the boundary between the sub-pixels adjoining in the horizontal direction. Alternatively, the shielding layer may be formed of a metallic film or a shielding material such as black resin. In the first embodiment, the shielding portion is a shielding layer 121BM of black resin above the groove 115z. This is because alignment failure of liquid crystal is easily caused by a height difference formed on the first substrate 110 by the groove 115z, and consequently, contrast failure due to light leakage occurs in the region where the groove 115z is disposed.

A transparent protective film 122 made of, for example, acrylic resin, is provided on the color filter 121. The transparent protective film 122 serves to prevent degradation of the color layers due to the entry of impurities, and to flatten the surface of the color filter 121.

A counter electrode (common electrode) 123 formed of a transparent conductor, such as ITO, is provided on the transparent protective film 122. When the elements 113 are two-terminal nonlinear elements, as in the first embodiment, the counter electrode 123 is formed by a plurality of belt-shaped electrodes extending horizontally and arranged in parallel in the vertical direction, that is, in stripes as a whole. When the elements 113 are three-terminal nonlinear elements like TFTs, a single common electrode is provided such as to commonly face a plurality of sub-pixels G arranged in the horizontal and vertical directions.

A spacer 132 shown in FIG. 4 is made of an insulating resin, and is formed on the first substrate 110 by photolithography. The spacer 132 may be fixed to one of the substrates, or may be placed without being fixed to any of the substrates. Alternatively, the spacer 132 may be omitted from the display region by mixing a spacer material in the sealing material.

Alignment films 118 and 124 are respectively formed on inner surfaces of the first and second substrates 110 and 120 having the above-described structures, for example, by applying an alignment material, such as an alignment resin, and baking or drying the alignment material. Typically, a polyimide resin is applied by printing (e.g., letterpress printing) or spin coating, and is then baked at a predetermined temperature. When the alignment films 118 and 124 thus formed do not have a liquid crystal aligning ability, they are subjected to aftertreatment such as rubbing, as required.

Since the surface of the first substrate 110 is uneven because of the surface irregularities of the insulating film 115, the flow of the applied alignment material is sometimes hindered, and the thickness of the alignment film becomes nonuniform particularly in the transmissive display regions. Consequently, alignment defects of liquid crystal occur, and display becomes uneven. However, in the first embodiment, the recesses 115x provided in the transmissive display regions Gt are horizontally connected by the recesses 115x, and the grooves 115z extend vertically. Therefore, the alignment material can easily flow in both the horizontal and vertical directions, and display unevenness can be reduced. In particular, since the grooves 115z extend such that the recesses 115x and 115y in the sub-pixels G adjoining in the vertical direction communicate with each other, fluidity of the alignment material in the vertical direction can be enhanced.

Further, the recesses 115y extend along the boundaries between the sub-pixels G adjoining the vertical direction, and the grooves 115z extend along the boundaries between the sub-pixels G adjoining in the horizontal direction. Therefore, it is possible to reduce the influence of alignment defects of liquid crystal due to the height differences, which are formed by the recesses or the grooves, on the display. In particular, since the depth of the grooves 115z is smaller than the thickness of the insulating layer 115, the height differences themselves are reduced, and alignment defects of liquid crystal due to the grooves 115z are reduced further.

While each groove 115z extends along the line 112 (above the line 112 in the first embodiment), since a part of the insulating film 115 in the thickness direction remains under the groove 115z, a short circuit of the line 112 to the reflecting layer 116 and the pixel electrode 117 can be prevented.

Preferably, a portion of the insulating layer 115 in the thickness direction, for example, a portion of the insulating layer 115 having a thickness equal to the thickness of the inner bottom portion of the groove 115z remains at the intersection of the recess 115y and the groove 115z in order to shield the line 112. However, the insulating film 115 may be entirely removed at the intersection.

While the recesses 115x provided in the transmissive display regions Gt are connected in the horizontal direction by the narrow recesses 115y extending along the boundaries between the sub-pixels G adjoining in the vertical direction in the first embodiment, the width of the recesses 115y in the vertical direction may be set to be equal to the width of the recesses 115x in the vertical direction so that belt-shaped recesses horizontally extend through the transmissive display regions Gt.

Second Embodiment

Figure 5:
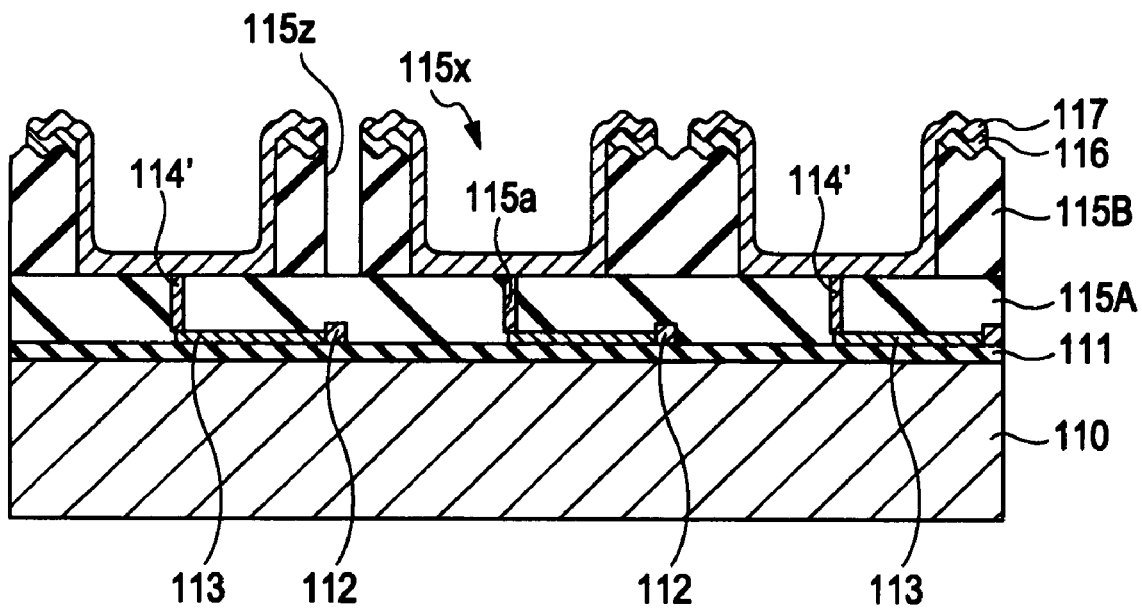
FIG. 5 is a schematic longitudinal sectional view of a first substrate in a liquid crystal device according to a second embodiment of the invention.

A liquid crystal device according to a second embodiment of the invention will now be described with reference to FIG. 5. In the second embodiment, components similar to those in the first embodiment are denoted by the same reference numerals, and descriptions thereof are omitted. It should be noted that structures that are not shown in the figure are similar to the first embodiment.

In the second embodiment, a transparent lower insulating layer 115A is provided on lines 112 and elements 113 that are similar to those in the first embodiment. An upper insulating layer 115B is provided on the lower insulating layer 115A. The upper insulating layer 115B does not need to be formed of a transparent material. Similarly to the insulating layer 115 in the first embodiment, the upper insulating layer 115B is patterned to form recesses 115x and grooves 115z. The recesses 115x and the grooves 115z are formed at portions where the upper insulating layer 115B is not provided. Therefore, inner bottom portions of the recesses 115x and the grooves 115z are formed by a surface of the lower insulating layer 115A. A surface of the upper insulating layer 115B has fine irregularities, and a reflecting layer 116 provided on the surface forms a scattering reflecting surface, in a manner similar to that in the first embodiment.

Contact electrodes 114' electrically connected to the elements 113 are respectively provided in contact holes 115a provided in the lower insulating layer 115A, and are electrically connected to pixel electrodes 117 disposed on the lower insulating layer 115A via the contact holes 115a. The contact holes 115a may be formed by performing a patterning step after the recesses 115x and the grooves 115z by patterning the upper insulating layer 115B, or may be formed together with the recesses 115x and the grooves 115z by photolithography using a half-tone mask after the lower insulating layer 115A and the upper insulating layer 115B made of photosensitive resin are stacked.

Since the lower insulating layer 115A is provided between the lines 112 and the inner bottom portions of the grooves 115z, when a combination of the lower insulating layer 115A and the upper insulating layer 115B corresponds to the insulating film in the first embodiment, a part of the insulating film is interposed between the lines 112 and the inner bottom portions of the grooves 115z, similarly to the first embodiment. Therefore, it is possible to reliably prevent a short circuit of the lines 112 to a reflecting layer 116 and the pixel electrodes 117.

While the depth of the grooves 115z is equal to the depth of the recesses 115x in the second embodiment, it may be smaller than the depth of the recesses 115x as in the first embodiment.

Third Embodiment

Figure 6:
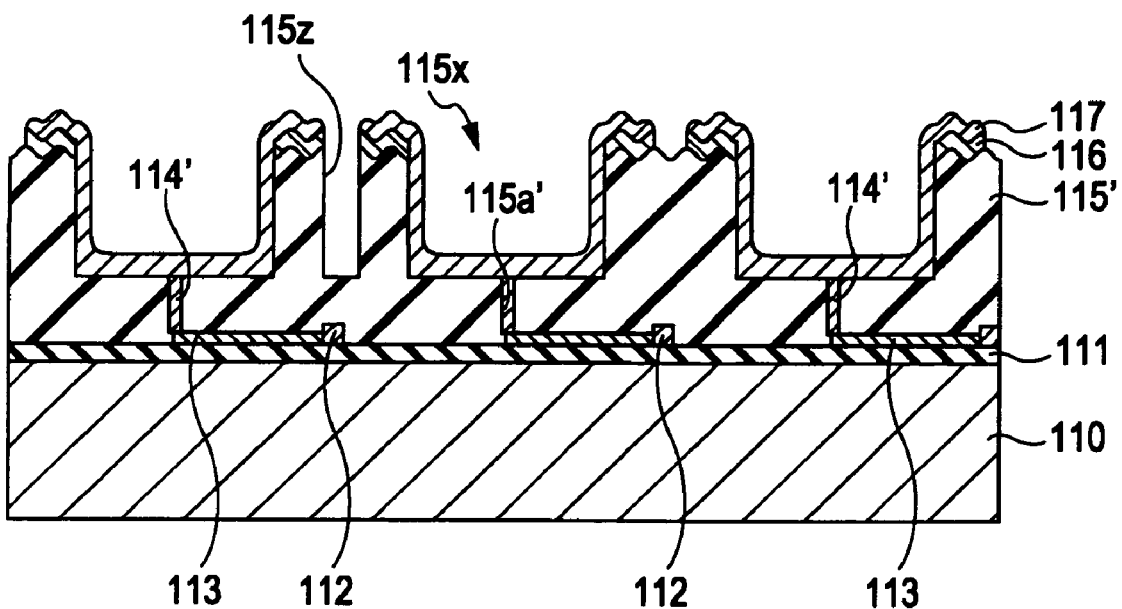
FIG. 6 is a schematic longitudinal sectional view of a first substrate in a liquid crystal device according to a third embodiment of the invention.

A liquid crystal device according to a third embodiment of the invention will now be described with reference to FIG. 6. In the third embodiment, the lower insulating layer 115A and the upper insulating layer 115B in the second embodiment are replaced with a single insulating film 115'. Since other structures are similar to those in the second embodiment, they are denoted by the same reference numerals, and descriptions thereof are omitted.

The depths of recesses 115x and grooves 115z are smaller than the thickness of the insulating film 115', and a part of the insulating film 115' in the thickness direction remains under inner bottom portions of the recesses 115x and the grooves 115z. Since the part of the insulating film 115' in the thickness direction is interposed between lines 112 and the inner bottom portions of the grooves 115z, similarly to the second embodiment, a short circuit can be prevented.

After the lines 112 and elements 113 are formed, the insulating film 115' is formed, and the recesses 115x, the grooves 115z, and contact holes 115a' are then formed. Subsequently, contact electrodes 114 are formed in the contact holes 115a', and a reflecting layer 116 and pixel electrodes 117 are formed. When the insulating film 115' is patterned, formation of the recesses 115x and the grooves 115z and formation of the contact holes 115a' may be performed in separate steps, as in the second embodiment, or may be simultaneously performed by using a half-tone mask or the like.

While the depth of the grooves 115z is equal to the depth of the recesses 115x in the third embodiment, it is more preferable that the depth of the grooves 115z be smaller than the depth of the recesses 115x, in a manner similar to that in the first embodiment.

Fourth Embodiment

Figure 7:
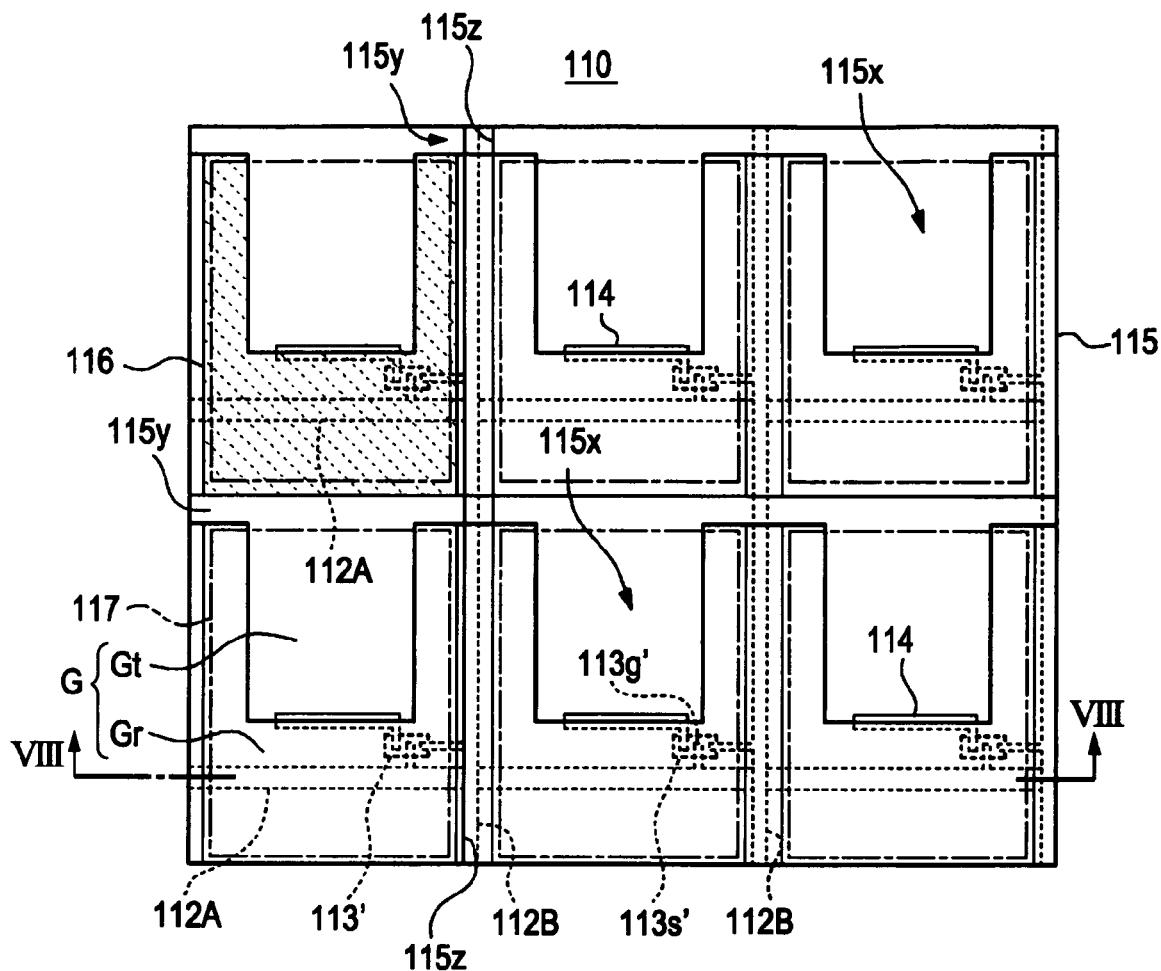
FIG. 7 is a schematic plan view of a first substrate in a liquid crystal device according to a fourth embodiment of the invention.
Figure 8:
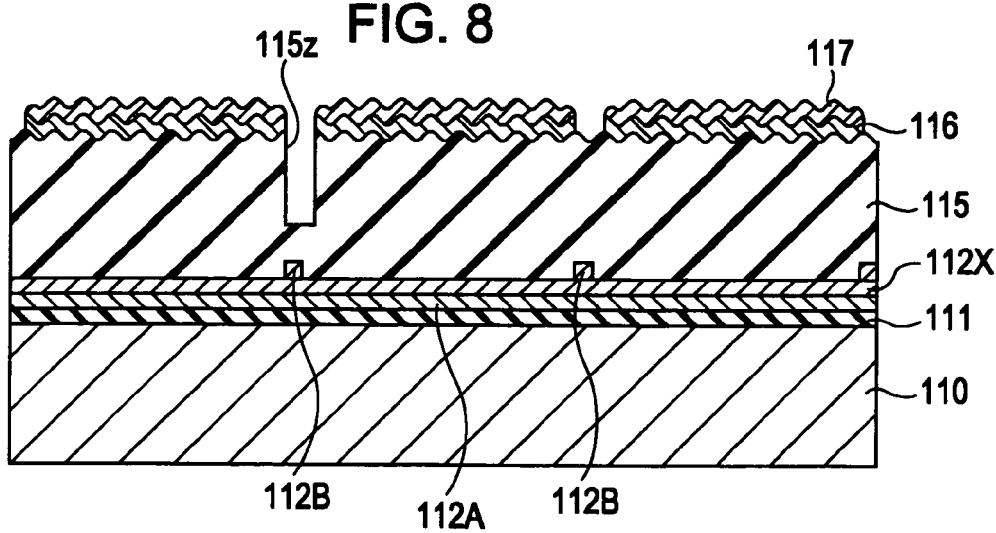
FIG. 8 is a schematic longitudinal sectional view of the first substrate, taken along line VIII-VIII in FIG. 7.

A fourth embodiment of the invention will now be described with reference to FIGS. 7 and 8. In the fourth embodiment, the same components as those in the first embodiment are denoted by the same reference numerals, and descriptions thereof are omitted. Components that are not shown in the figures are basically similar to those in the first embodiment, unless otherwise specified.

Unlike the above-described embodiments, elements 113' provided in respective sub-pixels G in the fourth embodiment are three-terminal nonlinear elements such as TFTs. Therefore, lower horizontal lines (scanning lines) 112A and upper vertical lines (signal lines) 112B are connected to the elements 113'. A counter electrode is provided on a second substrate (not shown) as a common electrode such as to face all sub-pixels G.

An interlayer insulating layer 112X is provided on the lower lines 112A, and the upper lines 112B are provided thereon.

Each element 113' includes a gate electrode 113g' electrically connected to the line 112A (or provided integrally with the line 112A), and a semiconductor layer 113s' opposing the gate electrode 113g' with an unshown gate insulating layer therebetween, and formed of polycrystalline silicon or amorphous silicon. A portion of the semiconductor layer 113s' on one side of a channel region facing the gate electrode 113g' is electrically connected to the line 112B, and a portion thereof on the other side of the channel region is electrically connected to a contact electrode 114. The contact electrode 114 is exposed at an edge of an inner bottom portion of a recess 115x, and is electrically connected to a pixel electrode 117, in a manner similar to that in the first embodiment.

While the lower lines 112A are not easily short-circuited because the interlayer insulating layer 112X is provided thereon, the upper lines 112B are easily short-circuited to a reflecting layer 116 and the pixel electrode 117 if grooves 115z are formed through an insulating film 115 in the thickness direction. This is because only the insulating film 115 is provided on the lines 112B.

In the fourth embodiment, however, since the depth of the groove 115z is smaller than the thickness of the insulating film 115, a part of the insulating film 115 in the thickness direction remains under the inner bottom portion of the groove 115z. This prevents a short circuit between the upper lines 112B, and the reflecting layer 116 and the pixel electrodes 117.

Fifth Embodiment

A fifth embodiment of the invention will now be described with reference to FIG. 9. In the fifth embodiment, the same components as those in the first embodiment are denoted by the same reference numerals, and descriptions thereof are omitted. Components that are not shown in the figure are basically similar to those in the first embodiment, unless otherwise specified.

Figure 9:
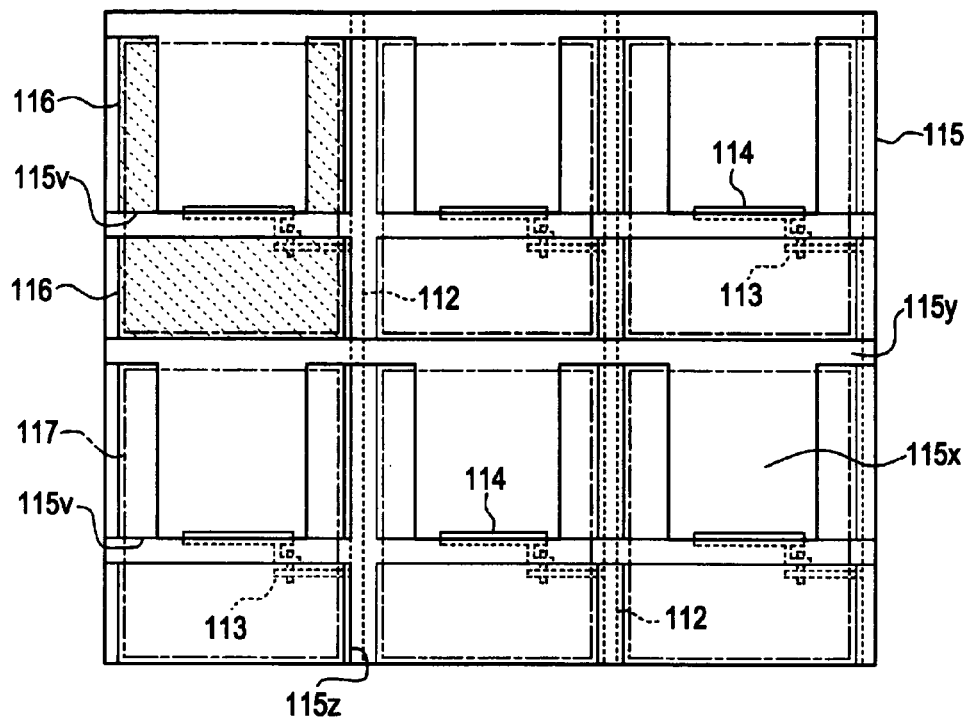
FIG. 9 is a schematic plan view of a first substrate in a liquid crystal device according to a fifth embodiment of the invention.

FIG. 9 is a schematic plan view of a first substrate 110 adopted in the fifth embodiment. The fifth embodiment is different from the first embodiment in that horizontally extending grooves 115v are further provided. Each groove 115v extends along the boundaries between transmissive display regions Gt and reflective display regions Gr in a plurality of sub-pixels G adjoining in the horizontal direction. Similarly to the above-described grooves 115z, the depth of the grooves 115v is smaller than the depth of recesses 115x provided in the transmissive display regions Gt. A contact electrode 114 is exposed at an edge of an inner bottom portion of each recess 115x, and is electrically connected to a pixel electrode 117, in a manner similar to that in the first embodiment.

The addition of the grooves 115v allows an alignment material to more easily flow between the recesses 115x in the horizontal direction. While a recess 115y extends on one vertical side of the recess 115x in the transmissive display region Gt, the groove 115v faces the other vertical side of the recess 115x. Therefore, fluidity of the alignment material in the horizontal direction is enhanced on both sides of the recess 115x. This further reduces display unevenness.

Since the groove 115v is provided above an element 113, if it has a depth similar to that of the recess 115x provided in the transmissive display region Gt, a risk of a short circuit between the element 113, and a reflecting layer 116 and the pixel electrode 117 is increased. In the fifth embodiment, however, since the depth of the groove 115v is smaller than that of the recess 115x, a short circuit can be prevented.

Sixth Embodiment

A sixth embodiment of the invention will now be described with reference to FIG. 10 and 11. In the sixth embodiment, the same components as those in the fourth embodiment are denoted by the same reference numerals, and descriptions thereof are omitted.

Figure 10:
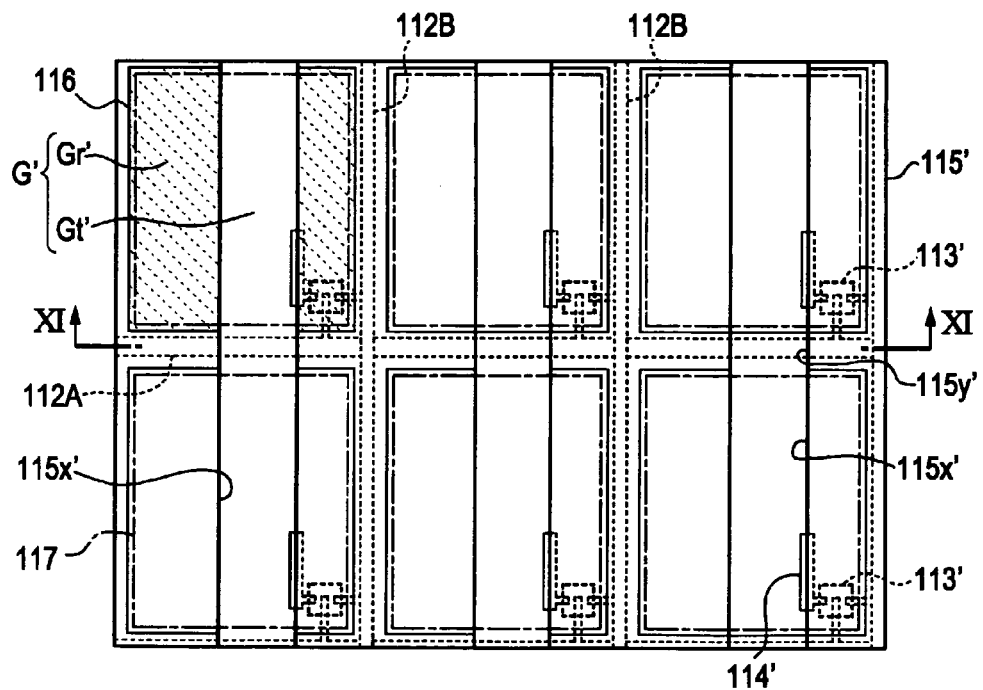
FIG. 10 is a schematic plan view of a first substrate in a liquid crystal device according to a sixth embodiment of the invention.
Figure 11:
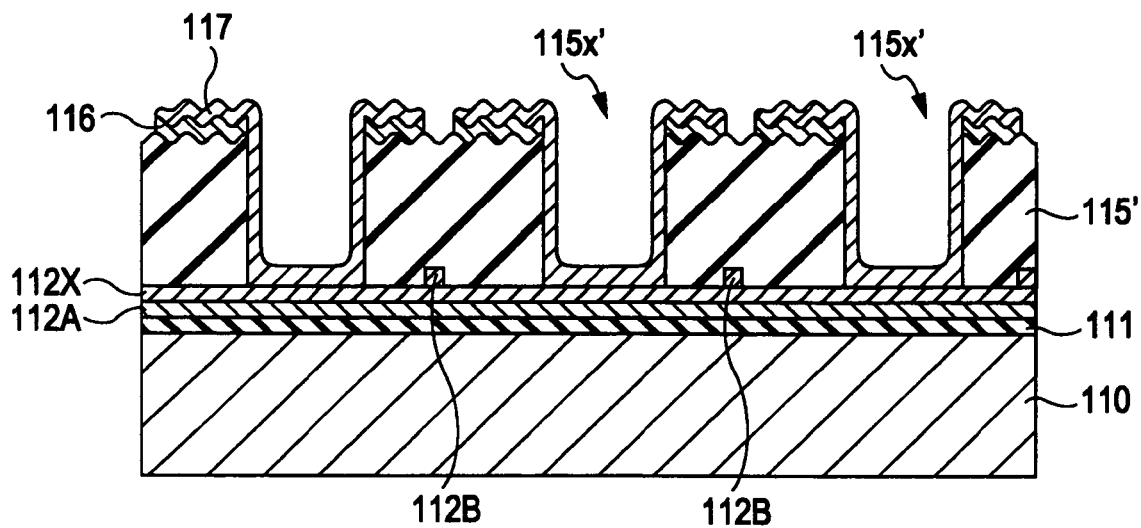
FIG. 11 is a schematic longitudinal sectional view of the first substrate, taken along line XI-XI in FIG. 10.

FIGS. 10 and 11 are a schematic plan view and a schematic longitudinal sectional view, respectively, of a first substrate. In the sixth embodiment, recesses 115x' are provided in transmissive display regions Gt' of sub-pixels G', and are connected in the vertical direction along a plurality of sub-pixels G'. More specifically, recesses 115y' are provided at the boundaries between sub-pixels G' adjoining in the vertical direction, and the recesses 115x' are connected in the vertical direction by the recesses 115y'.

The recess 115x' and the recess 115y' have the same horizontal width, and constitute a belt-shaped integral recess extending vertically. That is, a plurality of belt-shaped recesses are arranged in parallel in the horizontal direction, that is, in stripes as a whole. While a reflective display region Gr' is provided on each horizontal side of the transmissive display region Gt' in each sub-pixel G', it may be provided only one side. Upper lines 112B extending vertically are completely shielded by portions of an insulating film 115' other than the recesses.

While lower lines 112A, an interlayer insulating layer 112X, and the upper lines 112B are provided, as in the fourth embodiment, the transmissive display regions Gt' are connected in the vertical direction by the recesses 115x' and the 115y'. In this case, the recesses connected in the vertical direction extend across the lines 112A. Since the lines 112A are disposed under the interlayer insulating layer 112X, a short circuit does not occur. On the other hand, since the upper lines 112B are completely shielded by the portions of the insulating film 115' other than the recesses, a short circuit due to the lines 112B does also not occur. A contact electrode 114 is exposed at an edge of an inner bottom portion of each recess 115x', and is electrically connected to a pixel electrode 117, in a manner similar to that in the first embodiment.

Electronic Apparatus

Figure 12:
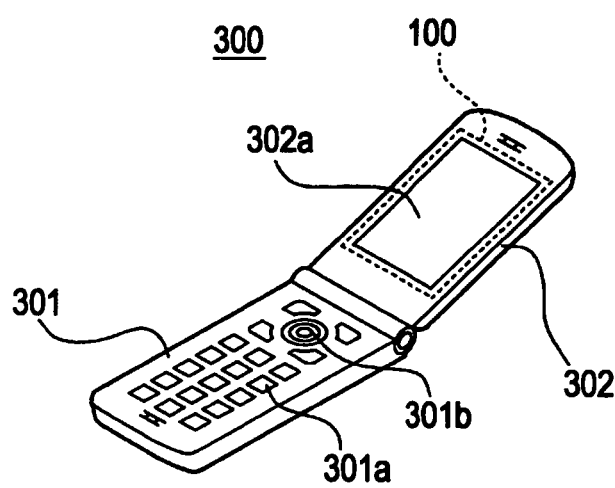
FIG. 12 is a schematic perspective view of an electronic apparatus.

Finally, a description will be given of an electronic apparatus including the above-described liquid crystal device 100. FIG. 12 is a schematic perspective view of an electronic apparatus.

FIG. 12 shows a mobile telephone 300 serving as an electronic apparatus according to an embodiment of the invention. The mobile telephone 300 includes an operation unit 301 having a plurality of operation buttons 301a and 301b and a mouthpiece, and a display unit 302 having a display screen 302a and an earpiece. The above-described liquid crystal device 100 is incorporated in the display unit 302. A display image formed by the liquid crystal device 100 can be viewed on the display screen 302a of the display unit 302. In this case, the mobile telephone 300 includes a display control circuit for controlling the liquid crystal device 100. The display control circuit sends picture signals, other input data, and predetermined control signals to the liquid crystal device 100, and determines the operations of the liquid crystal device 100.

It should be noted that the liquid crystal device and the electronic apparatus according to the embodiments of the invention are not limited to the above-described illustrated embodiments, and various modifications can be made without departing from the scope of the invention. For example, while the grooves in the above-described embodiments are square or rectangular in cross section, and the inner bottom portions of the recesses are flat, these shapes are given for convenience of illustration, and the inner bottom portions do not always need to be flat. The cross section of the grooves may have other shapes, for example, a U-shape, a V-shape, or a W-shape.

The entire disclosure of Japanese Patent Application No: 2005-286275, filed Sep. 30, 2005 is expressly incorporated by reference herein.

What is claimed is:

1. A liquid crystal device comprising:
a pair of substrates;
a liquid crystal layer provided between the substrates; and
a plurality of sub-pixels each having a transmissive display region and a reflective display region,
wherein one of the substrates includes:
switching elements corresponding to the sub-pixels;
lines connected to the switching elements; and
an insulating film provided on the switching elements and the lines,
wherein the insulating film includes first recesses provided in the transmissive display regions, and second recesses provided along boundaries between the adjoining sub-pixels,
wherein at least a part of the insulating film other than the first and second recesses planarly overlaps with the reflective display regions,
wherein the thickness of the liquid crystal layer is smaller in the reflective display regions than in the transmissive display regions having the first recesses, and
wherein the depth of the second recesses is smaller than the depth of the first recesses.

2. The liquid crystal device according to claim 1, wherein the sub-pixels are arranged in a horizontal direction and a vertical direction, the first recesses are connected in the horizontal direction, and the second recesses extend along the boundaries between the sub-pixels adjoining in the horizontal direction.

3. The liquid crystal device according to claim 1, wherein the sub-pixels are arranged in a horizontal direction and a vertical direction, the first recesses are connected in the horizontal direction, and the second recesses extend in the vertical direction.

4. The liquid crystal device according to claim 1, wherein the sub-pixels are arranged in a horizontal direction and a vertical direction, each of the second recesses includes a portion extending in the horizontal direction and a portion extending in the vertical direction.

5. A liquid crystal device comprising:
a pair of substrates;
a liquid crystal layer provided between the substrates; and
a plurality of sub-pixels each having a transmissive display region and a reflective display region,
wherein one of the substrates includes:
switching elements corresponding to the sub-pixels;
lines connected to the switching elements; and
an insulating film provided on the switching elements and the lines,
wherein the insulating film includes first recesses provided in the transmissive display regions, and second recesses provided above the lines,
wherein at least a part of the insulating film other than the first and second recesses planarly overlaps with the reflective display regions,
wherein the thickness of the liquid crystal layer is smaller in the reflective display regions than in the transmissive display regions having the first recesses, and
wherein the depth of the second recesses is smaller than the depth of the first recesses.

6. The liquid crystal device according to claim 5, wherein the second recesses are grooves extending along the lines.

7. The liquid crystal device according to claim 5, wherein the sub-pixels are arranged in a horizontal direction and a vertical direction, the first recesses are connected in the horizontal direction, and the second recesses extend in the vertical direction.

8. The liquid crystal device according to claim 5, wherein the sub-pixels are arranged in a horizontal direction and a vertical direction, and the lines extend in the vertical direction, and
wherein the liquid crystal device further includes:
lower lines extending in the horizontal direction below the lines; and
an interlayer insulating layer provided between the lines and the lower lines.

9. A liquid crystal device comprising:
a pair of substrates;
a liquid crystal layer provided between the substrates; and
a plurality of sub-pixels each having a transmissive display region and a reflective display region,
wherein one of the substrates includes:
switching elements corresponding to the sub-pixels;
lines connected to the switching elements;
an insulating film provided on the switching elements and the lines; and
a reflecting layer provided on the insulating film in the reflective display regions,
wherein the lines extend along boundaries between the adjoining sub-pixels,
wherein the insulating film includes first recesses provided in the transmissive display regions, and second recesses provided along the lines,
wherein at least a part of the insulating film other than the first and second recesses planarly overlaps with the reflective display regions,
wherein the thickness of the liquid crystal layer is smaller in the reflective display regions than in the transmissive display regions having the first recesses, and
wherein a part of the insulating film in a thickness direction is provided between the lines and inner bottom portions of the second recesses.

10. The liquid crystal device according to claim 9, wherein the insulating film includes:
a lower insulating layer provided in the transmissive display regions and the reflective display regions; and
an upper insulating layer provided in the reflective display regions, and
wherein the lower insulating layer is interposed between the lines and the inner bottom portions of the second recesses.

11. The liquid crystal device according to claim 1, further comprising:
pixel electrodes electrically connected to the switching elements in the respective sub-pixels; and
contacts provided between the switching elements and the pixel electrodes at edges of inner bottom portions of the recesses.

12. An electronic apparatus comprising the liquid crystal device according to claim 1 as a display unit.

* * * * *